US010053001B1

United States Patent
Nabbe et al.

(10) Patent No.: US 10,053,001 B1
(45) Date of Patent: Aug. 21, 2018

(54) SYSTEM AND METHOD FOR VISUAL COMMUNICATION OF AN OPERATIONAL STATUS

(71) Applicant: Apple Inc., Cupertino, CA (US)

(72) Inventors: Bartholomeus C. Nabbe, Redwood City, CA (US); Byron B. Han, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/266,357

(22) Filed: Sep. 15, 2016

Related U.S. Application Data (60) Provisional application No. 62/232,048, filed on Sep. 24, 2015.

(51) Int. Cl.
*B60Q 1/50* (2006.01)
*B60Q 1/34* (2006.01)

(52) U.S. Cl.
CPC .......... *B60Q 1/346* (2013.01); *B60Q 2400/50* (2013.01)

(58) Field of Classification Search
CPC ..................... B60Q 1/346; B60Q 2400/50
USPC .......................................................... 340/464
See application file for complete search history.

(56) References Cited

U.S. PATENT DOCUMENTS

| | | | | |
|---|---|---|---|---|
| 7,844,394 B2* | 11/2010 | Kim | ....................... | G01C 21/36 340/995.2 |
| 2003/0023370 A1* | 1/2003 | Millington | ......... | G01C 21/3415 701/411 |
| 2003/0147247 A1* | 8/2003 | Koike | .................... | B60Q 1/484 362/464 |
| 2005/0117364 A1* | 6/2005 | Rennick | ................ | B60R 1/1207 362/540 |
| 2007/0277100 A1* | 11/2007 | Sheha | ................ | G01C 21/3632 715/256 |
| 2009/0069977 A1* | 3/2009 | Markyvech | ............ | G01C 21/36 701/41 |
| 2010/0328055 A1* | 12/2010 | Fong | ...................... | B60Q 9/005 340/425.5 |

(Continued)

OTHER PUBLICATIONS

"Nissan IDS Concept: Nissan's vision for the future of EVs and autonomous driving," Oct. 27, 2015, http://nissannews.com/en-US/nissan/usa/releases/nissan-ids-concept-nissan-s-vision-for-the-future-of-evs-and-autonomous-driving, accessed Sep. 14, 2016.

Primary Examiner — Zhen Y Wu
(74) Attorney, Agent, or Firm — Polsinelli PC (57) ABSTRACT

Aspects of the present disclosure involve systems, methods, computer program products, and the like, for displaying an operational status of a system. In one particular implementation, the operational status of an autonomous vehicle is displayed. The operational status of the vehicle may indicate an operational state of the vehicle, such as whether the vehicle is in manual control mode or autonomous control mode. In addition to displaying the operational state, the vehicle may also display an intended or future maneuver by the vehicle. For example, the vehicle may determine a route for the autonomous vehicle that includes various operations or steps and may display one or more of the operations or steps of the route. This information may be displayed such that an external observer to the vehicle may determine the near-future operation autonomous vehicle is about to perform. Other information concerning the operation of the vehicle may also be displayed.

19 Claims, 8 Drawing Sheets

(56) References Cited

U.S. PATENT DOCUMENTS

| | | | |
|---|---|---|---|
| 2011/0046835 A1* | 2/2011 | Taguchi | B60W 10/06 701/22 |
| 2011/0090093 A1* | 4/2011 | Grimm | G01S 5/0072 340/901 |
| 2012/0242479 A1* | 9/2012 | Ghazarian | B60Q 1/346 340/465 |
| 2013/0345900 A1* | 12/2013 | Usui | B60W 30/12 701/1 |
| 2014/0268353 A1* | 9/2014 | Fujimura | G02B 27/0101 359/630 |
| 2014/0365126 A1* | 12/2014 | Vulcano | G01C 21/36 701/533 |
| 2015/0066284 A1 | 3/2015 | Yopp | |
| 2015/0151725 A1* | 6/2015 | Clarke | B60W 30/00 701/28 |
| 2015/0183430 A1* | 7/2015 | Schwindt | B60W 30/12 701/23 |
| 2016/0040997 A1* | 2/2016 | Otani | G01C 21/3629 701/522 |
| 2016/0061613 A1* | 3/2016 | Jung | G01C 21/3632 701/49 |
| 2016/0068099 A1* | 3/2016 | Peterson | G01C 21/3658 701/36 |
| 2016/0207443 A1* | 7/2016 | Widdowson | B60Q 1/0011 |
| 2016/0375900 A1* | 12/2016 | Laur | B60W 30/09 701/41 |

\* cited by examiner

SYSTEM AND METHOD FOR VISUAL COMMUNICATION OF AN OPERATIONAL STATUS

CROSS REFERENCE TO RELATED APPLICATIONS

This application is related to and claims priority under 35 U.S.C. § 119(e) from U.S. Patent Application No. 62/232,048, filed Sep. 24, 2015, titled "SYSTEM AND METHOD FOR VISUAL COMMUNICATION OF AN OPERATIONAL STATUS," the entire contents of each are incorporated herein by reference for all purposes.

TECHNICAL FIELD

This disclosure relates generally to providing a visual indication of an operation status, and more specifically to displaying an operational status of an autonomous vehicle to an external observer of the vehicle.

BACKGROUND

It is often advantageous for systems and/or machines to provide some indication of an operational status or of an executing operation to users of the system. In a similar manner, providing an indication of the system to external observers may also be beneficial. For example, operators of vehicles often provide some indication of an intended maneuver of the vehicle, such as by initiating a turn signal before making a lane change. Such an indication alerts other nearby drivers or pedestrians to the intention of the driver of the vehicle such that the other nearby drivers and pedestrians may react accordingly. Further, many drivers provide other, more subtle cues as the intention of the driver while operating the vehicle that are viewed and considered by the other nearby drivers and pedestrians when reacting to the operation of the vehicle. For example, multiple views in a rearview mirror by a driver may indicate the driver intends on changing lanes, regardless of whether the driver uses a turn signal.

Because many drivers rely on these indicators when driving, some are uncomfortable operating a vehicle around autonomous or unmanned vehicles. In particular, many drivers are unsure of the operation of an autonomous vehicle such that they cannot anticipate how the vehicle is going to move in traffic and fail to react normally to the presence of the autonomous vehicle while driving. This may lead to avoidable collisions between cars and unsafe driving conditions. Thus, providing indications of the operation of the autonomous vehicle aids other drivers and pedestrians in anticipating the movement of the autonomous vehicle and, ultimately, makes such observers more comfortable with the presence of the autonomous vehicles on the roads.

SUMMARY

One implementation of the present disclosure may take the form of a method for operating an autonomous vehicle. The method may include the operations determining a route for the autonomous vehicle from a starting location to a destination location, the route comprising at least one operation control of the autonomous vehicle corresponding to a next step in the calculated route, calculating an estimated time to the next step in the calculated route, and displaying an indicator of the next step in the calculated route on an external surface prior to executing the at least one operation control of the autonomous vehicle.

Another implementation of the present disclosure may take the form of a system for operating an autonomous vehicle. The system may include a non-transitory database storing one or more geographic maps of a region and a processing device in communication with the non-transitory database for calculating a route for the autonomous vehicle from a starting location to a destination location utilizing at least one geographic map of the region, the route comprising at least one operation control of the autonomous vehicle corresponding to a next step in the calculated route. The system may also include a geographic position system (GPS) locator in communication with the processing device, the processing device further utilizing the GPS locator to calculate an estimated time to the next step in the calculated route based at least on a current geographic location of the GPS locator and a display system displaying an indicator of the next step in the calculated route on an external surface prior to executing the at least one operation control of the autonomous vehicle.

DETAILED DESCRIPTION

Aspects of the present disclosure involve systems, methods, computer program products, and the like, for displaying an operational status of a system. In one particular implementation, the operational status of an autonomous vehicle is displayed. The operational status of the vehicle may indicate an operational state of the vehicle, such as whether the vehicle is in manual control mode or autonomous control mode. The operational state of the vehicle may be displayed to an external observer of the vehicle such that the observer may determine when the vehicle is in an autonomous mode or manual mode. In addition to displaying the operational state, the vehicle may also display an intended or future maneuver by the vehicle. For example, the vehicle may determine a route for the autonomous vehicle that includes various operations or steps. In one implementation of the present disclosure, the vehicle may display one or more of the operations or steps of the route. For example, the vehicle may display a "next step" in the route of a right turn. This information may be displayed such that an external observer to the vehicle may determine the near-future operation autonomous vehicle is about to perform. Other information concerning the operation of the vehicle may also be displayed, as explained in more examples below.

In general, by displaying the operational status, such as the state of the vehicle and/or an intended maneuver of the vehicle, to an observer external to the vehicle, such an observer may become more comfortable with the operation of the vehicle. Further, by displaying the intended movement of the vehicle, accidents and other misunderstandings with the autonomously controlled vehicle may be avoided. In one particular embodiment, the vehicle may display the operational status onto a road or other surface near the vehicle. For example, the vehicle may project a turn arrow onto the ground or road surface near the vehicle to indicate that the vehicle is turning or will soon turn. In another embodiment, the vehicle may include a display device integrated into the vehicle that is visible to an external observer. The display device may be configured to display any operational status information for the vehicle to the external observer. In yet another embodiment, the vehicle may include one or more visual or aural indicators, such as lights or sirens, which provide the operational status indication to the external observer. In general, any type of displaying of the operational status information is contemplated.

Figure 1:
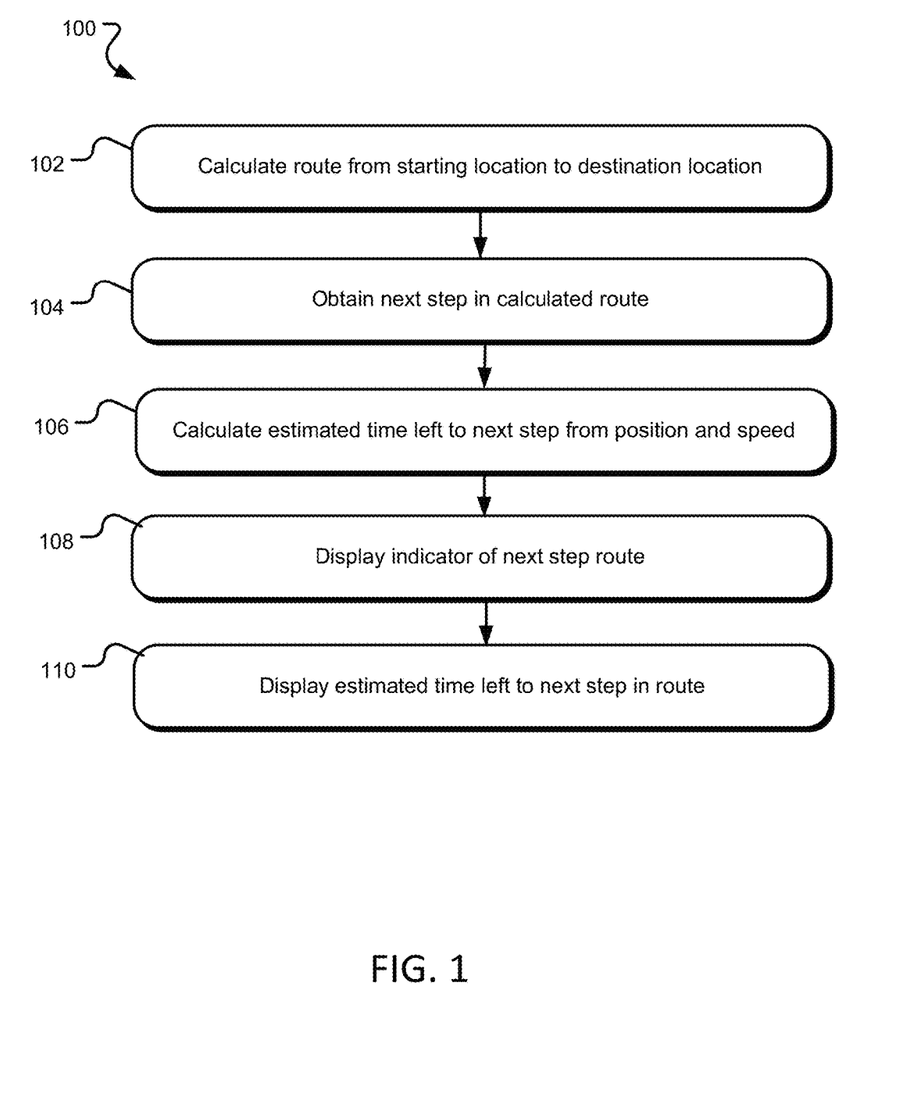
FIG. 1 is a flowchart of a method for providing a visual indication of an operational status of an autonomous vehicle.

FIG. 1 is a flowchart of a method for providing a visual indication of an operational status of an autonomous vehicle. In general, the operations may be performed by a vehicle, and more particularly an autonomous vehicle. However, the operations may be performed by any type of system that includes different operational statuses. In one alternate embodiment, the operations are performed by a user-controlled vehicle to display or otherwise indicate to an external observer the operations or movements of the vehicle.

Beginning in operation 102, the vehicle receives a start location and a destination location for a route. In general, the vehicle stores or has access to a map of a region containing the start location and the destination location stored in a database. With the map information, the vehicle calculates a route between the start location and the end location. In one example, the route includes the streets or roads utilized to reach the destination from the start point, although other components of the map may also be included in the route, such as bike paths, walking paths, sidewalks, pedestrian bridges, etc. Thus, although discussed herein as include a drivable route from the start location to the destination location, any component of a map of a region may be utilized in generating the route.

In one implementation, the start location and the destination location may be provided to the vehicle by a user of the device. For example, the vehicle may include some type of user input component that allows a user of the device to provide an address, a name associated with a location (such as a building, business, amusement park, airport, etc.), or other location identifier to provide the start location and/or the destination location of the route. The vehicle may then determine an associated location within the map region for the start location and destination location. In another implementation of the vehicle, the start location may be a GPS-determined location of the device or a user of the device. For example, vehicle may determine a geographic location of the device utilize GPS. This location may be assumed by the device as a start location for the requested route.

In one implementation, the route may also include information about the series of steps the vehicle may perform to travel the route, such as which directions the vehicle turns and/or travels (such as "left turn", "right turn", "U-turn", "north", "south", etc.), lane information such as which lane the vehicle should be in to perform the next step in the series of steps of the route, localized information of the area around the roads of the route (such as local businesses and services), an estimated time to traverse the initial route, an estimated time of arrival, alternate routes and estimated times to traverse the alternate routes, and the like. Further, in one or more implementations, the vehicle may receive traffic information for roads along the initial and/or alternate routes and utilize the information when estimating the time of arrival. Also, in some implementations, the vehicle may receive one or more user settings to aid in calculating the initial route. For example, a user of vehicle may prefer to set the shortest route in distance as the initial calculated route. In another example, the user may prefer the shortest route in travel time such that, upon calculating multiple routes from the start location to the destination location, the vehicle provides the quickest route to the user as the initial route. The vehicle may consider current traffic conditions and speed limits of roads when calculating the length of time for traveling various routes.

In operation 104, the vehicle obtains the next step or vehicle operation in the calculated route. As mentioned, the route of the vehicle may include a series of steps that are performed by the vehicle to traverse the route. Such steps may include "left turn", "right turn", "U-turn", "continue straight", "lane change", "reverse direction" and the like. In general, any movement of the vehicle that is controllable by the vehicle controller may be obtained as the "next step" in the calculated route. Further, in operation 106, the vehicle calculates an estimated time left until the next step in the route is executed by the vehicle. To calculate the estimated time to the next step in the route, the vehicle may consider the vehicle's current position, the distance to the next step operation, the current speed of the vehicle, an estimated speed of the vehicle along one or more portions of the route, and the like. In one implementation, the current location of the vehicle and the distance to the next step may be obtained through a GPS device. The estimated speed of the vehicle along one or more portions of the route may consider current traffic conditions along the route as obtained from a central server or from other traffic information sources.

In operation 108, the vehicle displays an indicator of the next step in the route. As discussed above, the display of the next step in the route may include projecting the indicator on a surface near the vehicle, such as on a road surface. In general, the indicator may be projected on any surface, including vertical surfaces, horizontal surface, angled surfaces, rounded surfaces, and the like. For example, a bright image projector, such as a laser painter may be located on the vehicle that produces a visual dynamic cue, such as a blinking, moving, or dynamically indicated arrow showing the direction of a moving vehicle or the intended direction of a stationary vehicle. The use of light projection on the road or other surface may increase the visibility of the car to other drivers and/or pedestrians. Further, the images may be projected in response information received from the one or more sensors and/or information from the other sources, such as a navigation path from a navigation device. The illumination of the image may be bright enough to produce a significant contrast compared to the surrounding medium, through the use of high intensity, and/or colored lights. These illumination sources include visible light laser sources which can rapidly paint shapes faster than they eye can process, or high illuminance projectors which can focus an image at various distances.

In one implementation, a direct scan laser device or devices may form an image by reflecting laser beams off of a fast tip-tilt Micro-Electro-Mechanical System (MEMS) mirror which can scan through the angular area of an image faster than a human can perceive the motion. Contrast of intensity and color in the image can be made by a variety of ways, either by controlling the time spent at a particular angle through the scan mirror slew rate, or by varying the brightness of the laser synchronized to the angular displacement. In another implementation, a wavefront phase manipulation system may be utilized to project the image onto a surface. Such a system may provide for a dynamic volumetric projection with a large field of focus that enables the system to project image information over a complex surface with variable standoff distances while maintaining focus of the image.

In another example, the display of the next step may include displaying the indicator of the next step on a display device of the vehicle. One such display device may be oriented on the vehicle toward the back of the vehicle such that drivers in other vehicles behind the displaying vehicle can observe the display device. However, the display device may be located anywhere on or near the vehicle. Further, the display device may be any type of known or hereafter device for displaying one or more images. For example, the display device may be a liquid crystal display (LCD) or plasma-type display device. In another particular example, the display device may be integrated into or otherwise associated with the vehicle. The type of indicator, along with other information, may be displayed on the display device. Several examples of the types of information displayed on the display device are discussed in more detail below.

As mentioned, any type of information may be displayed on the display device or projected onto the surface. Thus, in one particular implementation, the calculated estimated time to the next step in the calculated route may be displayed in operation 110. In addition to displaying the estimated time left, the estimated time left may be adjusted to provide a displayed countdown to the operation that accompanies the next step. For example, as the vehicle nears the location of the next step of the route such as a left turn, the display may provide a countdown until the autonomous vehicle executes the left turn. The countdown and other displayed information may aid one or more external observers to the vehicle in determining or anticipating the operation or movement of the vehicle. Such information may make the observer comfortable with the vehicle being driven autonomously.

Although discussed above as illustrating a next step in a route or an estimated time or distance to the next step, it should be appreciated that one or more of the operations may not be executed by the display system. For example, the autonomous vehicle may provide an indication of the state of the vehicle, such as autonomous state or manual state. To display such an indicator, the vehicle may not determine a route for the vehicle or the estimated time to a next step. Rather, the vehicle may determine the operational state of the vehicle and provide the associated indicator. The indicator may be a color displayed from the vehicle that is associated with the operational state of the vehicle. In another example, the indicator may be a symbol or icon displayed on the display device or projected onto a surface. In another implementation, the vehicle may display the next step without providing an indication of the time left to the next step or the distance. In such an implementation, the vehicle may omit the operations of estimating the time to the next step and/or displaying the estimated time left. In this manner, any information about the operational status of the vehicle may be displayed by the vehicle through the display device or through the projection of information onto a surface, with more or less information displayed at any one time.

The operational status information displayed by the vehicle may vary from circumstance to circumstance and may depend on several factors. In general, the operational status information is displayed to one or more external observers to aid the observer's comfort in being near the vehicle and to help the external observer in interacting with the movements of the vehicle. For example, the vehicle may display an intended movement of the vehicle, such as an intended lane change, so that drivers in other vehicles may see the intended movement and react accordingly. In this particular example, such a reaction may include providing space in a travel lane for the autonomous vehicle to change lanes into. In another example, the vehicle may display some indicator of a turning operation of the vehicle. This may signal to other drivers or pedestrians of the vehicles intended turning operation. Thus, drivers of other vehicles may slow to allow the autonomous vehicle to turn, while pedestrians may avoid crossing an intersection in front of the turning vehicle. In this manner, the display of operational status information about the vehicle may aid one or more external observers about the operation of the vehicle so that the external observers may react accordingly. Several examples of operational status information and indicators and the intended effect on the external observer are discussed below in more detail.

In one implementation, the displayed operational status may be utilized to mimic or approximate cues provided by drivers of non-autonomous vehicles. However, it may be determined that such cues are not the most effective way to cause the external observer to react to the intended movement or operational status of the vehicle. Thus, the types of information and indicators displayed by the vehicle may be adjusted over time and, in some cases, based on observations of real-world reactions to displayed information. For example, the vehicle may be programmed or configured to display a turn signal for an intended turning operation with a countdown to the execution of the operation. However, it may be determined that external observers respond and/or are more comfortable when a distance to the turning operation is projected or otherwise displayed instead of the countdown. In such a circumstance, the vehicle may be in communication with a network or may otherwise receive an update that adjusts the type of indicator displayed by the vehicle to the external observers. Further, the information concerning the response by the external observer may be aggregated from many such vehicles to fine-tune the operational status information displayed. In general, the types of indicators displayed and the inclusion of the indicators and information displayed by the vehicle may be updatable by the vehicle and may be based on any observed reaction to the displayed information.

As mentioned, the operational status information displayed by the vehicle or other operating system may vary depending on many factors, including the type of operational status, the intended observer, on observed reaction to the information, and the like. Several examples of operational status information displayed by a vehicle are discussed below. It should be appreciated, however, that other examples not discussed may also be displayed. For example, although not discussed below, the vehicle may display an operational state or mode to an external observer, such as by changing the color of one or more lights of the vehicle or displaying an icon or indicator on a display device or surface. As such, the examples discussed below are just some of the possible indicators, information, or icons displayed by an operating vehicle to aid an external observer as to the operation status of the vehicle.

Figure 2:
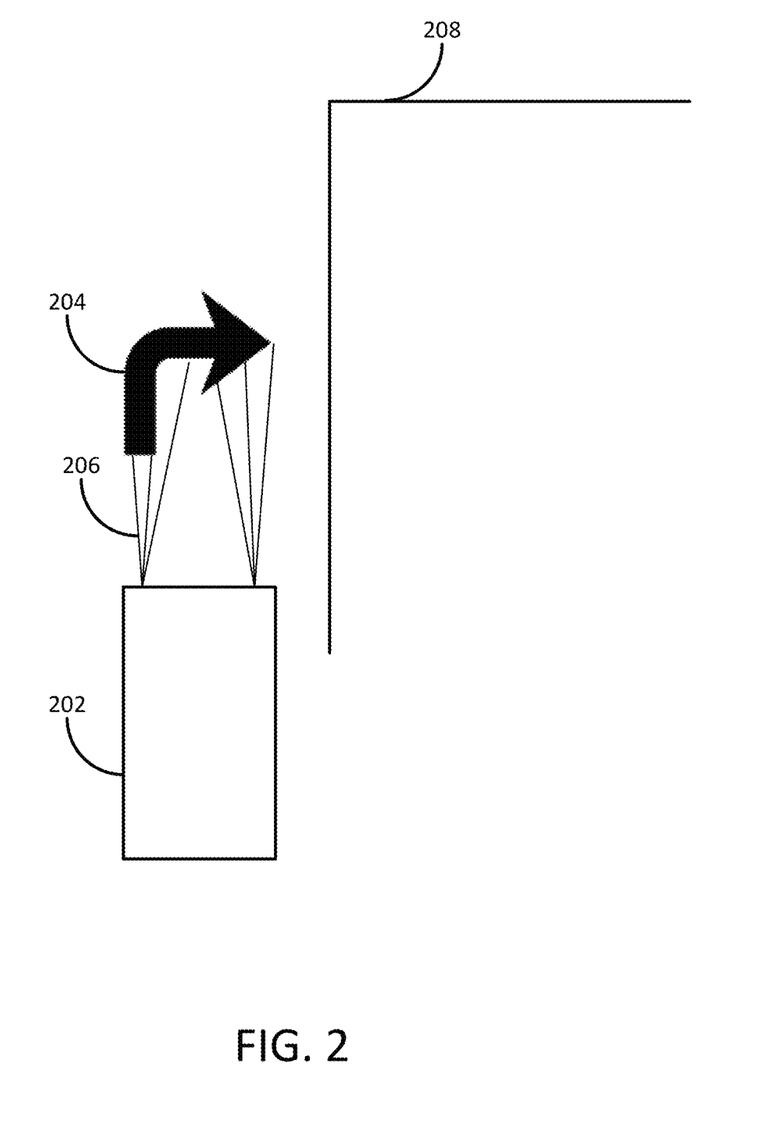
FIG. 2 is diagram of projecting a turn signal on a road surface.

FIG. 2 is diagram of a vehicle 202 projecting a turn signal icon 204 on a road surface. In one example, the turn signal icon 204 may be displayed by the vehicle 202 as an indication of a next step in a calculated route for the vehicle. In particular, the vehicle 202 may calculate a route for the vehicle. Said route may include a right hand turn at a particular intersection 208. In this example, the vehicle 202 may project 206 an indication of the right turn 204 on the road surface in front of the vehicle 202. The indication 204 may be projected onto the surface before the vehicle 202 executes the right turn at the intersection 208 to indicate to an external observer (such as drivers of other vehicles and/or pedestrians near the intersection 208) the vehicle is turning at the intersection. In one implementation, the image 204 may be projected 206 until the right turn is executed by the vehicle 202. Also, the indicator 204 may be projected regardless of which operational state the vehicle is in, either autonomous or manual. In another implementation, the image 204 may be projected only in the autonomous state or only in the manual state.

The turn image 204 may be projected by the vehicle 202 utilizing any of the devices discussed above. For example, the vehicle 202 may include an image projector utilizing a light source to project an image on the road surface. In another implementation, the indicator 204 is projected on the surface utilizing one or more laser light sources. Regardless of the projection device used, the right turn indicator 204 is projected onto a surface near the vehicle 202 to indicate to one or more external observers the intended movement or operation of the vehicle based on the calculated route of the vehicle.

Figure 3:
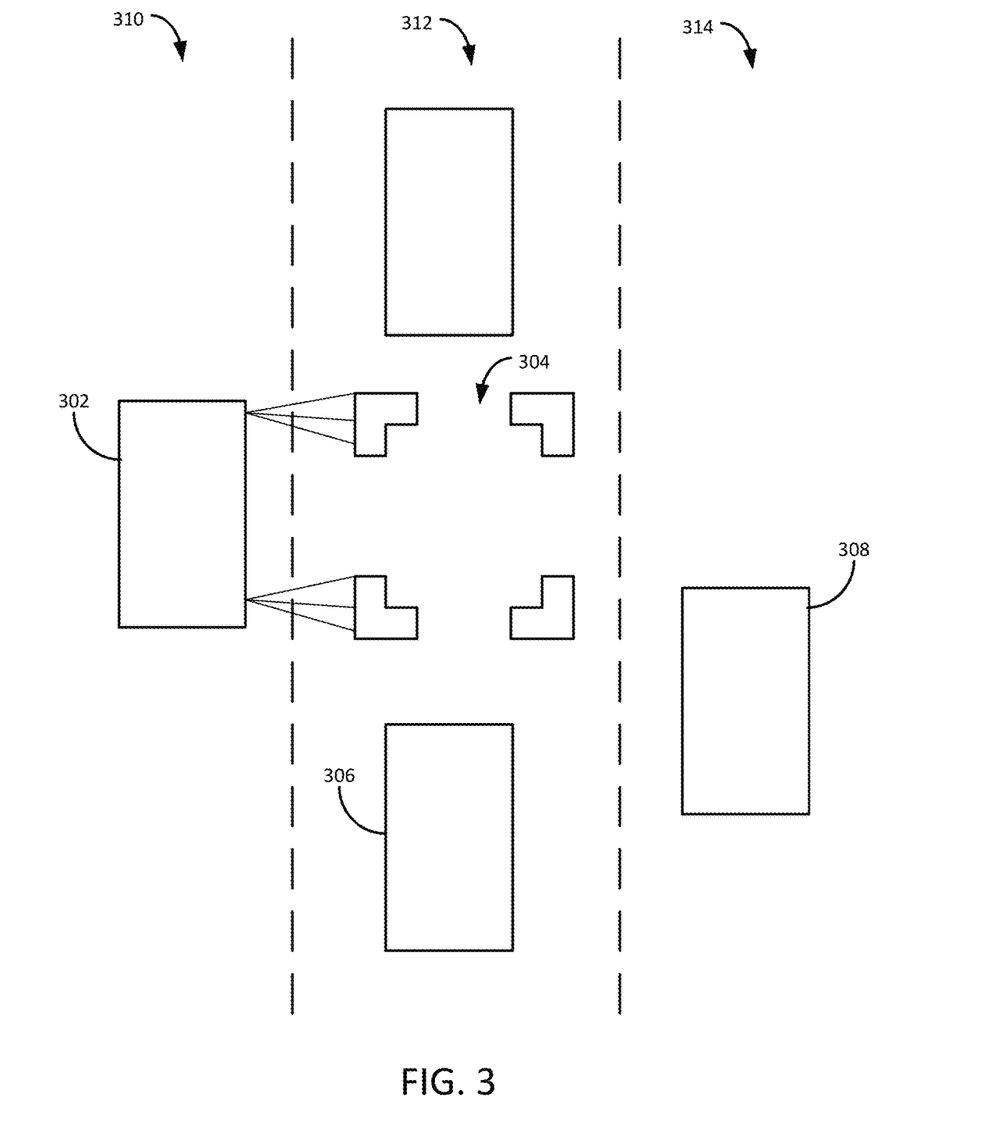
FIG. 3 is a diagram of projecting a lane change intention on a road surface.

Similarly, FIG. 3 is a diagram of a vehicle 302 projecting a lane change intention 304 on a road surface. As illustrated, the vehicle 302 may include more than one projection system to project images or icons 304 onto the road surface. For example, the vehicle 202 of FIG. 2 is an example of the vehicle utilizing a front-facing image projecting system to project the image on the surface in front of the vehicle while the vehicle 302 of FIG. 3 is an example of the vehicle utilizing a side-facing image projecting system to project the image on the surface on the side of the vehicle. In another example, the image projecting system may be configurable to project the image on a surface on any side of the vehicle 302. Regardless of the number and types of image projecting systems utilized by the vehicle 302, an indicator 304 of a lane change may be projected onto the surface in an adjacent lane to the projecting vehicle. In particular, the vehicle 302 may be traveling in a first lane 310. In response to an input by the operator of the vehicle or in response to a next step in a calculated route, the vehicle 302 may prepare to merge into lane 312. To indicate to the other vehicles and/or drivers 306, 308 near the vehicle 302, an indicator 304 of the intent to change lanes may be projected into the arriving lane 312. In response to projecting the indicator 304, the other vehicles and/or drivers 306, 308 may create room within the lane 312 for the merging vehicle 304 or otherwise react in accordance to the lane change indication.

In the implementation illustrated in FIG. 3, the lane change indicator 304 may include a defined box 304 shape that is similar to the shape and size of the merging vehicle 302. In a sense, this box 304 provides a footprint to indicate to the other vehicles 306, 308 of the space needed by the vehicle 302 to perform the lane change movement. However, the indicator 304 may be any shape and size that indicates the lane change maneuver of the vehicle 302. For example, the indicator 304 may be an image of the vehicle 302, may be an arrow, may be colored, may be animated, and the like.

Figure 4:
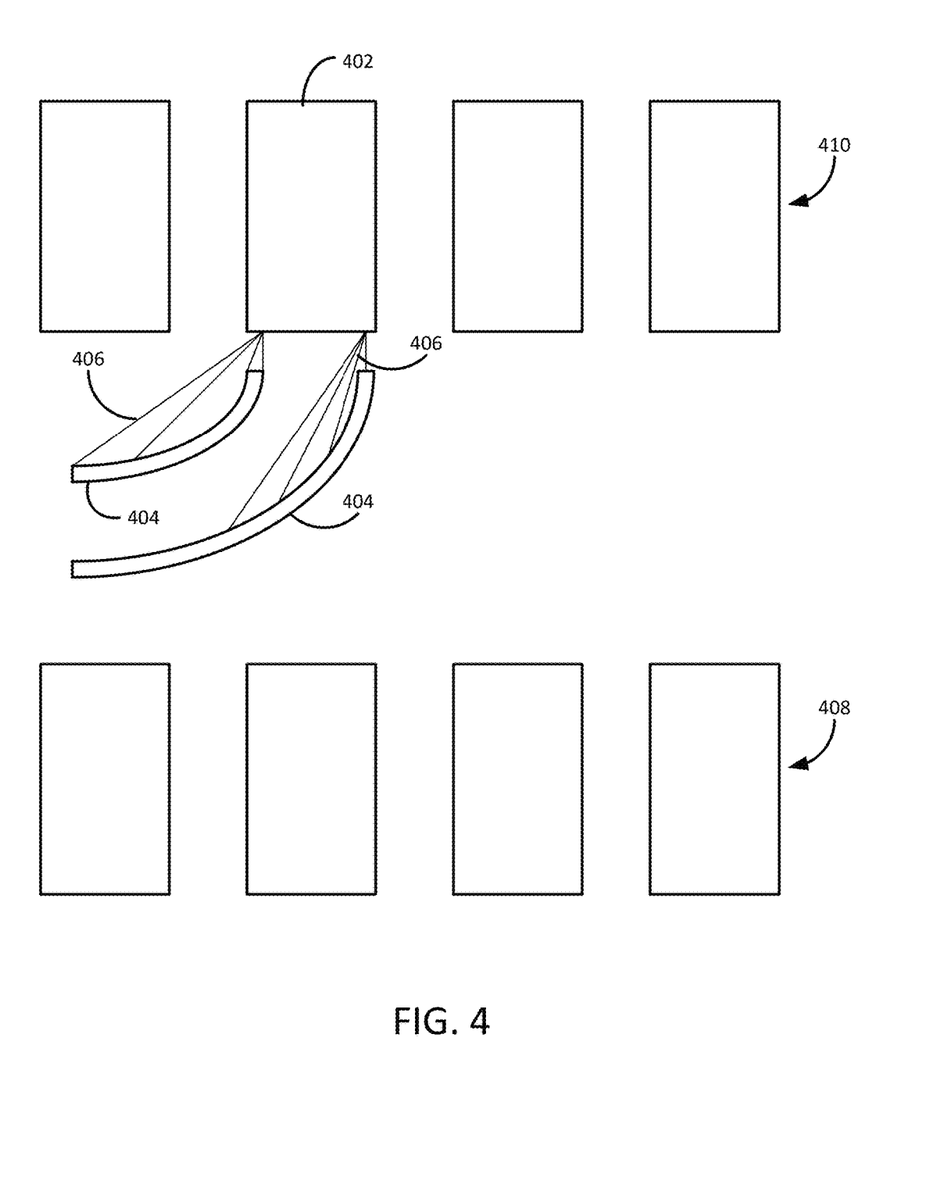
FIG. 4 is a diagram of projecting a reversing path on a road surface.

FIG. 4 is a diagram of a vehicle 402 projecting 406 a reversing path 404 on a surface. Similar to those examples described above, the vehicle 402 may utilize one or more projecting systems to project 406 the image or indicators 404 onto the surface. In the example of FIG. 4, the vehicle 402 projects 406 a possible path of the vehicle 404 as the vehicle reverses. In general, this projection 404 may be displayed by the vehicle 402 when the vehicle is backing out of a parking space in a parking area that includes one or more rows 408, 410 of parked vehicles. In addition, the projected reverse path 404 may be adjusted as the vehicle 402 executes the reverse maneuver. The reverse path 404 projected by the vehicle 402 may provide an indication of the vehicle's 402 movement to pedestrians and/or other drivers of vehicles as the vehicle backs out of the parking spot. In another implementation, the color of the projected indicator 404 may be altered during the course of the reverse maneuver. For example, the projected indicator 404 may begin as a white color and change to red as the vehicle 402 begins to follow the reverse path. The red color may indicate to an external observer that the vehicle is in motion and to not enter or cross the projected path 404. Further, the vehicle may be configured to stop if the observer or other object is detected in the projected path 404. In general, the vehicle may project 406 an indicator of any shape, size, or color to indicate the potential reverse path of the vehicle.

Figure 5:
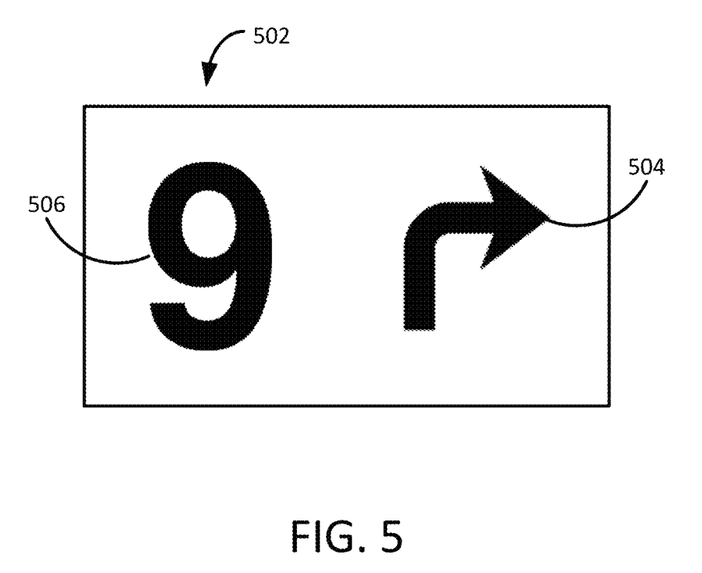
FIG. 5 is a diagram of a display device displaying a turn signal and a countdown to a turn operation.

The above examples illustrate an indicator of operational status of the vehicle being projected onto a surface observable by an external viewer. However, in a similar manner, the indication of the operational status of the vehicle may also be displayed on one or more display devices integrated or otherwise associated with the vehicle. For example, the display device of the vehicle may display the lane change indicator of FIG. 3, or any other type of indicator to indicate the lane change of the vehicle. Similarly, the display device may display the indicator of the turning operation of the vehicle discussed above with reference to FIG. 2. In particular, FIG. 5 is a diagram of one example of a display device 502 of a vehicle displaying a turn signal 504 and a countdown 506 to a turn operation of a vehicle. In one implementation, the display device 502 may display the turn signal 504 together with or separate from the projection of the turn signal on the road surface discussed above.

In one implementation, the display device 502 is oriented or configured so that an external observer to the vehicle may view indicators displayed by the display device. In the example illustrated in FIG. 5, the display device 502 includes an indicator of a turning operation 504. Similar to above, the indicator 502 of the turning operation may be obtained from a calculated route for the vehicle. In addition to the operation indicator 504, the display device 502 may also include an indication of a countdown 506 to the execution of the operation, in one particular implementation. In other implementations, the display device 502 may display more or less information concerning the operational status of the vehicle.

To provide the countdown indicator 506 on the display device 502, the vehicle may calculate an estimated time remaining until the execution of the displayed operation. As mentioned above, this estimation may include information concerning the route of the vehicle, such as an estimated speed limit on one or more roads of the route and estimated traffic congestion on one or more of the roads. As the time to the displayed operation reduces, the countdown indicator 506 may be adjusted accordingly. Further, the countdown indicator 506 may delay the countdown rate or may speed up the countdown rate as the estimated time is adjusted based the vehicle's detected position and speed. In general, the countdown indicator 506 provides an indication to an external observer as to the time left before the execution of the indicated vehicle operation 504.

Figure 6:
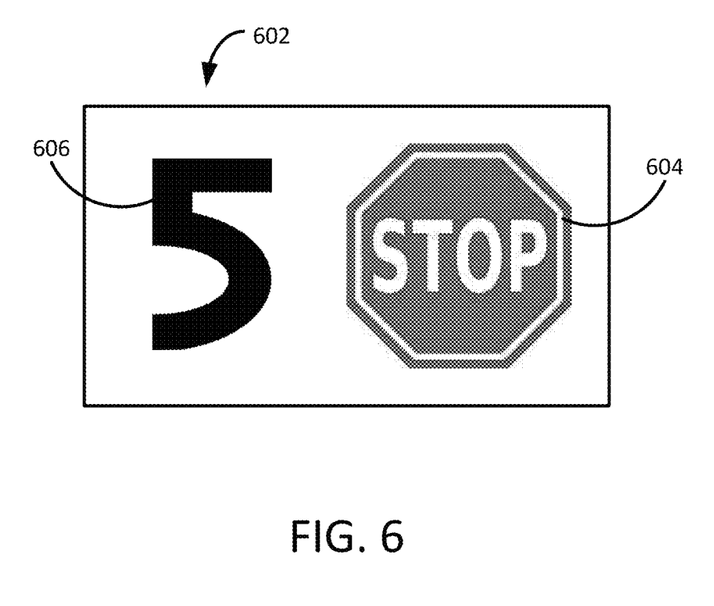
FIG. 6 is diagram of a display device displaying a stop signal and a countdown to a stop operation.

Other indicators of a vehicle operation may also be displayed by the display device. For example, FIG. 6 is a diagram of one example of a display device 602 of a vehicle displaying a stopping or slowing indicator 604 and a countdown 606 to the stopping or slowing operation of a vehicle. Such information may be displayed when the vehicle is slowing due to a next step in a calculated route or when a slowing operation indication is received from a driver of the vehicle (such as when the driver presses on a brake pedal). In general, when any indication of slowing the vehicle is received or anticipated based on a calculated route, an indication 604 of such may be displayed on the display device 602. Further, although illustrated in FIG. 6 as including a stop sign, the slowing indicator displayed on the display device 602 may be any type of indicator that indicates the speed of the vehicle is slowing. Also, in the instance where the slowing of the vehicle is anticipated from a calculated route, the display device 602 may include a countdown 606 as described above with reference to FIG. 5.

Figure 7:
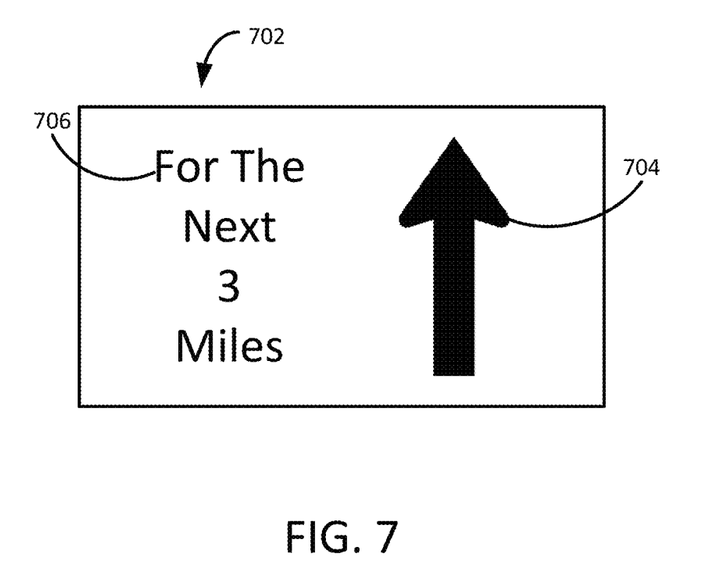
FIG. 7 is a diagram of a display device displaying an operational indication and a distance to a next step of route.

In a similar manner, the vehicle may be configured to provide information of the operational status of the vehicle between vehicle operations. For example, FIG. 7 is a diagram of one example of a display device 702 of a vehicle displaying a current operational state indication 704 and a distance 706 to a next step of a calculated route. Such information may be displayed when the vehicle is traveling or otherwise in motion to indicate that the vehicle's movement will not be changing. This information may aid an external observer when anticipating maneuvers of the vehicle may reassure the observer that the vehicle will maintain its current course for some time. In the example shown in FIG. 7, an arrow 704 indicating the traveling direction of the vehicle is illustrated. However, any type of indicator may be displayed on the display device 702 to indicate the vehicle will maintain its present course and direction for a particular time.

In addition to the arrow indicator 704, the display device 702 may also display a distance 706 or a countdown to a next step in a calculated route. Similar to the countdown described above, the distance until a next step or next vehicle operation may be determined from a vehicle's geographic position and a location for the next step. The distance between the vehicle's location and the next step location may then be displayed on the display device 702. This distance indication 706 may indicate to the external observer that the operational status displayed (such as the arrow 704 in FIG. 7) will remain the status until the distance to the next step 706 is traversed by the vehicle. With this information, the external observer may react to the vehicle's movement accordingly by assuming that the vehicle will not make a movement into a different lane of travel or turn unexpectedly.

Figure 8:
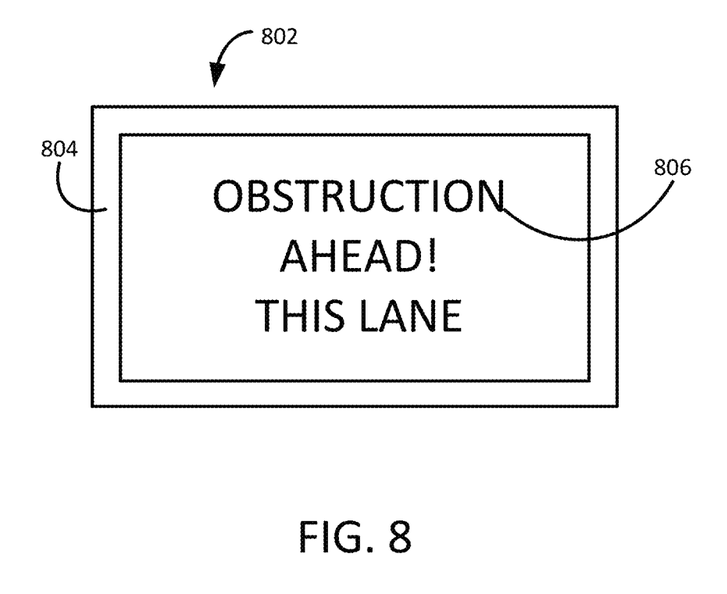
FIG. 8 is a diagram of a display device displaying a detected potential obstruction for operation of a vehicle.

In addition to providing information about the current movement and intended movement of the vehicle, the display device may also be utilized to provide general information that may be useful to an external observer. For example, FIG. 8 is a diagram of a display device 802 displaying a detected potential obstruction for operation of a vehicle. In the example illustrated, the display device 802 includes a warning 806 to an external observer that an obstruction in a travel lane in front of the vehicle is detected. In general, however, any information may be displayed on the display device 802. Further, the display device 802 may display other features to aid an external observer in interpreting the displayed message 806. For example, the display 802 may provide a colored border 804 around the display that indicates the type of message. In one implementation, a red colored border 804 may be displayed when the message 806 is urgent for an external observer. In general, any combination of colors, indicators, images, and the like may be included with the message 806 on the display device 802.

Although discussed above with reference to projecting onto a surface or displayed on a display device, any of the examples discussed may be either projected or displayed. For example, the estimated distance to the next step discussed in reference to FIG. 7 may be projected by the vehicle onto a surface. Similarly, the reverse path for the vehicle discussed in reference to FIG. 4 may be displayed on the display device. In some instances, indicators may be projected onto a surface and displayed on the display device simultaneously. In general, any combination of images, indicators, colors, animation, and the like may be projected onto a surface or displayed by a display device.

Figure 9:
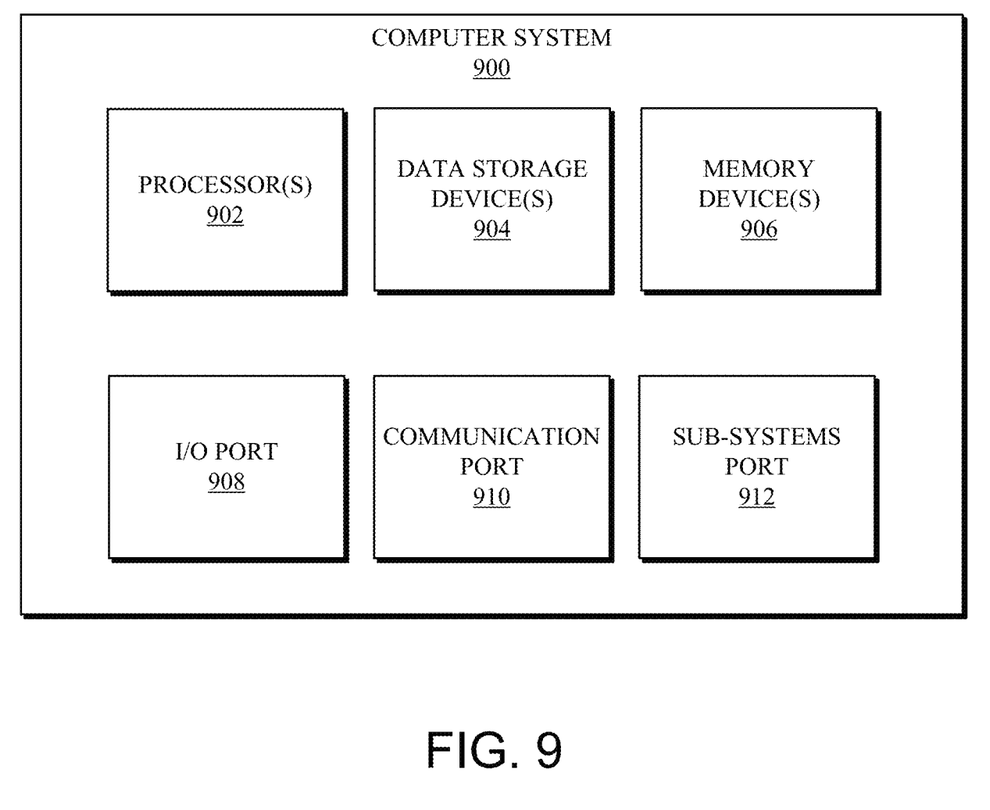
FIG. 9 is a diagram illustrating an example of a computing system which may be used in implementing embodiments of the present disclosure.

Referring to FIG. 9, a detailed description of an example computing system 900 having one or more computing units that may implement various systems and methods discussed herein is provided. The computing system 900 may be applicable to the measuring system 102 and other computing or network devices. It will be appreciated that specific implementations of these devices may be of differing possible specific computing architectures not all of which are specifically discussed herein but will be understood by those of ordinary skill in the art.

The computer system 900 may be a computing system is capable of executing a computer program product to execute a computer process. Data and program files may be input to the computer system 900, which reads the files and executes the programs therein. Some of the elements of the computer system 900 are shown in FIG. 9, including one or more hardware processors 902, one or more data storage devices 904, one or more memory devices 908, and/or one or more ports 908-912. Additionally, other elements that will be recognized by those skilled in the art may be included in the computing system 900 but are not explicitly depicted in FIG. 9 or discussed further herein. Various elements of the computer system 900 may communicate with one another by way of one or more communication buses, point-to-point communication paths, or other communication means not explicitly depicted in FIG. 9.

The processor 902 may include, for example, a central processing unit (CPU), a microprocessor, a microcontroller, a digital signal processor (DSP), and/or one or more internal levels of cache. There may be one or more processors 902, such that the processor 902 comprises a single central-processing unit, or a plurality of processing units capable of executing instructions and performing operations in parallel with each other, commonly referred to as a parallel processing environment.

The computer system 900 may be a conventional computer, a distributed computer, or any other type of computer, such as one or more external computers made available via a cloud computing architecture. The presently described technology is optionally implemented in software stored on the data stored device(s) 904, stored on the memory device(s) 906, and/or communicated via one or more of the ports 908-912, thereby transforming the computer system 900 in FIG. 9 to a special purpose machine for implementing the operations described herein. Examples of the computer system 900 include personal computers, terminals, workstations, mobile phones, tablets, laptops, personal computers, multimedia consoles, gaming consoles, set top boxes, and the like.

The one or more data storage devices 904 may include any non-volatile data storage device capable of storing data generated or employed within the computing system 900, such as computer executable instructions for performing a computer process, which may include instructions of both application programs and an operating system (OS) that manages the various components of the computing system 900. The data storage devices 904 may include, without limitation, magnetic disk drives, optical disk drives, solid state drives (SSDs), flash drives, and the like. The data storage devices 904 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 906 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 904 and/or the memory devices 906, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 900 includes one or more ports, such as an input/output (I/O) port 908, a communication port 910, and a sub-systems port 912, for communicating with other computing, network, or vehicle devices. It will be appreciated that the ports 908-912 may be combined or separate and that more or fewer ports may be included in the computer system 900.

The I/O port 908 may be connected to an I/O device, or other device, by which information is input to or output from the computing system 900. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 900 via the I/O port 908. Similarly, the output devices may convert electrical signals received from computing system 900 via the I/O port 908 into signals that may be sensed as output by a human, such as sound, light, and/or touch. The input device may be an alphanumeric input device, including alphanumeric and other keys for communicating information and/or command selections to the processor 902 via the I/O port 908. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 900 via the I/O port 908. For example, an electrical signal generated within the computing system 900 may be converted to another type of signal, and/or vice-versa. In one implementation, the environment transducer devices sense characteristics or aspects of an environment local to or remote from the computing device 900, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 900, such as, physical movement of some object (e.g., a mechanical actuator), heating or cooling of a substance, adding a chemical substance, and/or the like.

In one implementation, a communication port 910 is connected to a network by way of which the computer system 900 may receive network data useful in executing the methods and systems set out herein as well as transmitting information and network configuration changes determined thereby. Stated differently, the communication port 910 connects the computer system 900 to one or more communication interface devices configured to transmit and/or receive information between the computing system 900 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 910 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 910 may communicate with an antenna for electromagnetic signal transmission and/or reception. In some examples, an antenna may be employed to receive Global Positioning System (GPS) data to facilitate determination of a location of a machine, vehicle, or another device.

The computer system 900 may include a sub-systems port 912 for communicating with one or more systems related to a vehicle to control an operation of the vehicle and/or exchange information between the computer system 900 and one or more sub-systems of the vehicle. Examples of such sub-systems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

Figure 10:
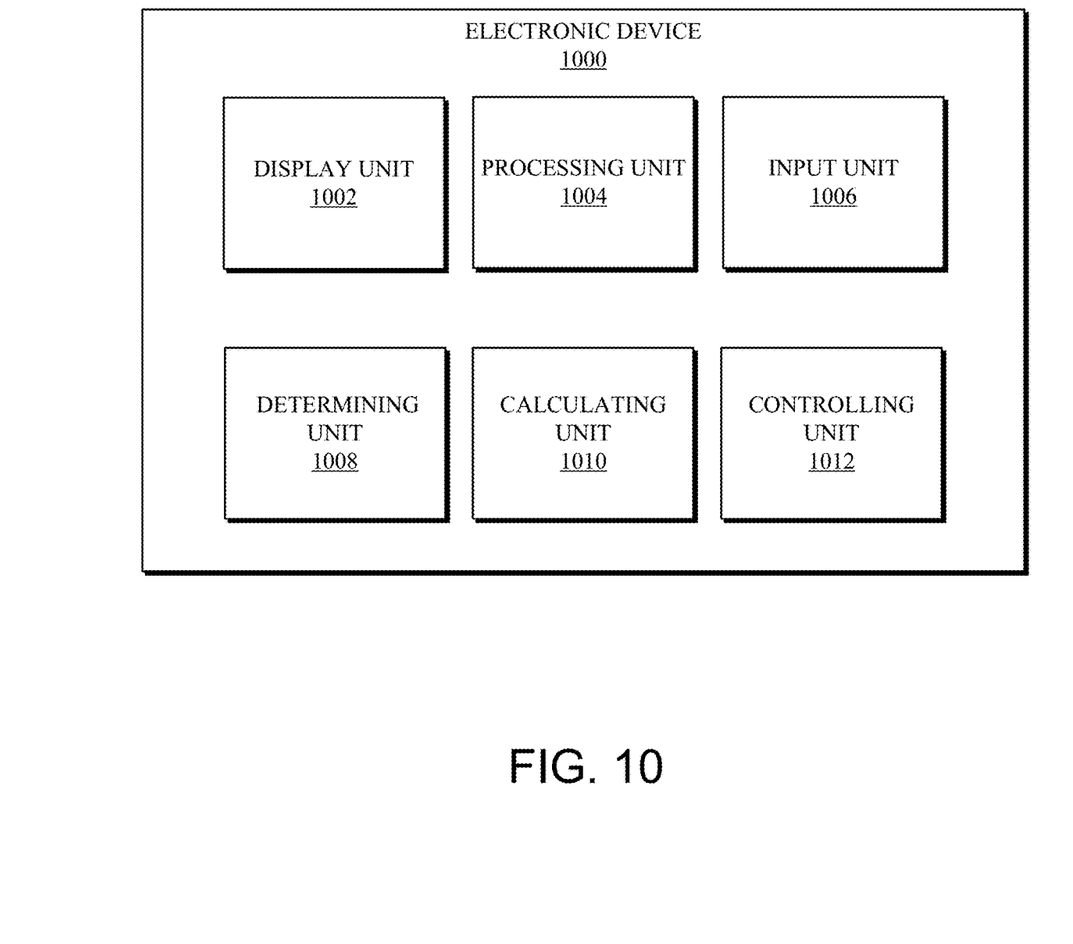
FIG. 10 is a functional block diagram of an electronic device including operational units arranged to perform various operations of the presently disclosed technology

FIG. 10 is a functional block diagram of an electronic device including operational units arranged to perform various operations of the presently disclosed technology. The diagram 1000 includes an electronic device 1000 including operational units 1002-1012 arranged to perform various operations of the presently disclosed technology is shown. The operational units 1002-1012 of the device 1000 are implemented by hardware or a combination of hardware and software to carry out the principles of the present disclosure. It will be understood by persons of skill in the art that the operational units 1002-1012 described in FIG. 10 may be combined or separated into sub-blocks to implement the principles of the present disclosure. Therefore, the description herein supports any possible combination or separation or further definition of the operational units 1002-1012.

In one implementation, the electronic device 1000 includes a display unit 1002 configured to display information, such as a graphical user interface, and a processing unit 1004 in communication with the display unit 802 and an input unit 1006 configured to receive data from one or more input devices or systems. Various operations described herein may be implemented by the processing unit 1004 using data received by the input unit 1006 to output information for display using the display unit 1002.

Additionally, in one implementation, the electronic device 1000 includes units implementing the operations described herein. For example, the device 700 may include a determining unit 1008 for determining a route for the autonomous vehicle from a starting location to a destination location, the route comprising at least one operation control of the autonomous vehicle corresponding to a next step in the calculated route. A calculating unit 1010 may calculate an estimated time to the next step in the calculated route. In some implementations, a controlling unit 1012 implements various operations for displaying an indicator of the next step in the calculated route on an external surface prior to executing the at least one operation control of the autonomous vehicle.

Although discussed above as methods described by the flowchart of FIG. 1, it should be appreciated that one or more operations may be omitted from the methods discussed. Further, the operations may be performed in any order and do not necessarily imply an order as provided. Rather, the methods discussed are merely one embodiment of the present disclosure as contemplated.

The present disclosure recognizes that the use of data may be used to the benefit of users. For example, the location information of a vehicle may be used to provide targeted information concerning a "best" path or route to the vehicle. Accordingly, use of such location data enables calculated control of an autonomous vehicle. Further, other uses for location data that benefit a user of the vehicle are also contemplated by the present disclosure.

The present disclosure further contemplates that the parties responsible for the collection, analysis, disclosure, transfer, storage, or other use of such location data will comply with well-established privacy policies and/or privacy practices. In particular, such parties should implement and consistently use privacy policies and practices that are generally recognized as meeting or exceeding industry or governmental requirements for maintaining personal information data private and secure. For example, personal location information of vehicles or users should be collected for legitimate and reasonable uses of the party and not shared or sold outside of those legitimate uses. Further, such collection should occur only after receiving the informed consent of the users. Additionally, such parties would take any needed steps for safeguarding and securing access to such information and ensuring that others with access to the information adhere to their privacy policies and procedures. Further, such parties can subject themselves to evaluation by third parties to certify their adherence to widely accepted privacy policies and practices.

Despite the foregoing, the present disclosure also contemplates embodiments in which users selectively block the use of, or access to, location data. That is, the present disclosure contemplates that hardware and/or software elements can be provided to prevent or block access to such location data.

Embodiments of the present disclosure include various operations or steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for operating an autonomous vehicle, the method comprising:
   determining, utilizing a computing device, a route for the autonomous vehicle from a starting location to a destination location, the route comprising at least one operation control to automatically maneuver the autonomous vehicle corresponding to a next step in the calculated route;
   calculating, utilizing the computing device, an estimated time to the next step in the calculated route;
   projecting through a display system an indicator of the next step in the calculated route on an external surface, the indicator of the next step comprising a shape corresponding to the next step selected from a plurality of indicator shapes and a countdown to an estimated time to the next step in the calculated route; and
   automatically executing the at least one operation control of the autonomous vehicle to maneuver the autonomous vehicle corresponding to the next step in the calculated route.

2. The method of claim 1 further comprising:
   displaying the estimated time to the next step in the calculated route on the external surface.

3. The method of claim 2 further comprising:
adjusting, through the display system, the displayed estimated time to the next step on the external surface based on a current speed and geographical position of the autonomous vehicle.

4. The method of claim 1 wherein the external surface is a display device oriented on the autonomous vehicle toward a rear portion of the autonomous vehicle.

5. The method of claim 1 wherein the external surface is a road surface adjacent to the autonomous vehicle.

6. The method of claim 5 wherein displaying the indicator of the next step in the calculated route on the road surface adjacent to the autonomous vehicle comprises projecting the indicator on the road surface utilizing a projection system.

7. The method of claim 1 wherein the indicator is an arrow indicator of the direction the at least one operation control of the autonomous vehicle orients the autonomous vehicle.

8. The method of claim 1 further comprising:
calculating an estimated distance to the next step in the calculated route; and
displaying the estimated distance to the next step in the calculated route on the external surface.

9. The method of claim 1 wherein the next step in the calculated route is a lane change operation from a first lane of travel to a second lane of travel and the indicator is displayed on a road surface of the second lane of travel.

10. The method of claim 9 wherein the projected indicator is a box-shaped object that indicates the location of the autonomous vehicle in the second lane of travel after the lane change operation is complete.

11. A system for operating an autonomous vehicle, the system comprising:
a non-transitory database storing one or more geographic maps of a region;
a processing device in communication with the non-transitory database for calculating a route for the autonomous vehicle from a starting location to a destination location utilizing at least one geographic map of the region, the route comprising at least one operation control to automatically maneuver the autonomous vehicle corresponding to a next step in the calculated route;
a geographic position system (GPS) locator in communication with the processing device, the processing device further utilizing the GPS locator to calculate an estimated time to the next step in the calculated route based at least on a current geographic location of the GPS locator; and
a display system projecting an indicator of the next step in the calculated route on an external surface prior to executing the at least one operation control of the autonomous vehicle, the display system comprising an external display screen integrated with the autonomous vehicle and the indicator comprises at least a countdown to an estimated time to the next step in the calculated route.

12. The system of claim 11 wherein the display screen is oriented on the autonomous vehicle toward a rear portion of the autonomous vehicle.

13. The system of claim 11 wherein the external surface is a road surface adjacent to the autonomous vehicle.

14. The system of claim 13 wherein the display system further comprises a projection system for displaying the indicator of the next step in the calculated route on the road surface adjacent to the autonomous vehicle.

15. The system of claim 11 wherein the processing device provides one or more instructions to the display device to adjust the displayed countdown to the estimated time to the next step on the external surface based on a current speed and current geographical location of the GPS locator.

16. The system of claim 11 wherein the indicator is an arrow indicator of the direction the at least one operation control of the autonomous vehicle orients the autonomous vehicle.

17. The system of claim 11 wherein the processing device further calculates an estimated distance to the next step in the calculated route and instructs the display device to display the estimated distance to the next step in the calculated route on the external surface.

18. The system of claim 11 wherein the next step in the calculated route is a lane change operation from a first lane of travel to a second lane of travel and the indicator is displayed on a road surface of the second lane of travel.

19. The system of claim 18 wherein the indicator displayed on the road surface of the second lane of travel is a box-shaped object.

* * * * *